Feb. 28, 1956     G. R. WALKER     2,736,256

AUTOMATIC TWINE TIE BALER

Filed June 15, 1955

INVENTOR.

Glynn R. Walker

BY Anderson and Spangler

ATTORNEYS

United States Patent Office 2,736,256
Patented Feb. 28, 1956

2,736,256

AUTOMATIC TWINE TIE BALER

Glynn R. Walker, Atwood, Kans.

Application June 15, 1955, Serial No. 515,581

2 Claims. (Cl. 100—19)

This invention relates to improvements in automatic twine tie balers of the type used extensively for harvesting hay.

Certain makes and models that have been marketed are defective in one particular, namely, that the twine frequently breaks during the tying operation causing much annoyance and loss of valuable time consumed in repairing the break. This defect is due to the fact that during the tying operation the twine is subjected to a sudden increase in tension during the short interval of time during which the knot is tied by the bill-hook or knotter.

It is the object of this invention to produce a simple attachment that can be readily applied to such defective balers and connected with the bill-hook rotating member for synchronous operation therewith; the attachment functioning to provide a predetermined amount of slack in the twine and to release the same at the instant that the bill-hook starts turning, thus preventing the production of excessive tension in the twine which causes the frequent breakage and delay above referred to.

The above and any other objects to which attention may be called or which will appear as the description proceeds is obtained by means of an attachment which has been illustrated in the accompanying drawing to which reference will now be had and in which.

Figure 1:
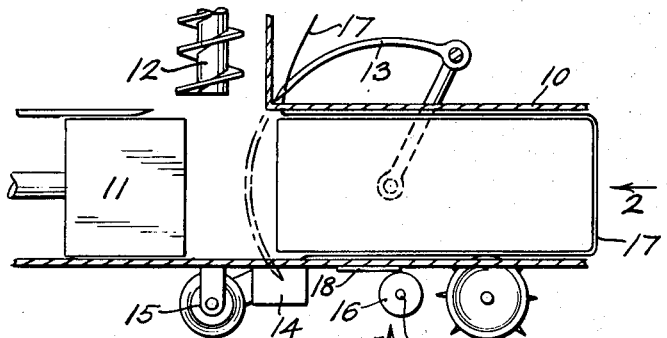
Figure 1 is a schematic diagram showing the relationship and relative positions of the several parts and is taken looking downwardly through plane 1—1 in Figure 2.
Figure 2:
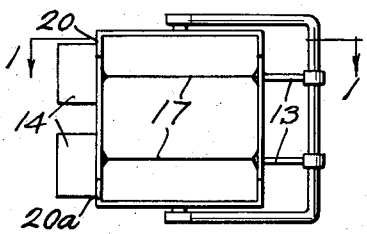
Figure 2 is a view looking in the direction of arrow 2 in Figure 1.
Figure 3:
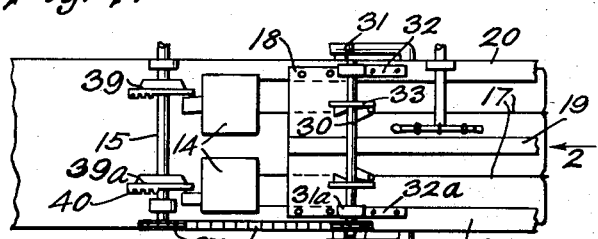
Figure 3 is a side elevational view looking upwardly in Figure 1.
Figure 4:
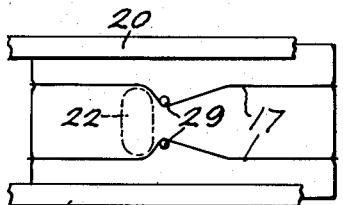
Figure 4 is a side elevational view illustrating how the twines are bent to produce the required slack.
Figure 5:
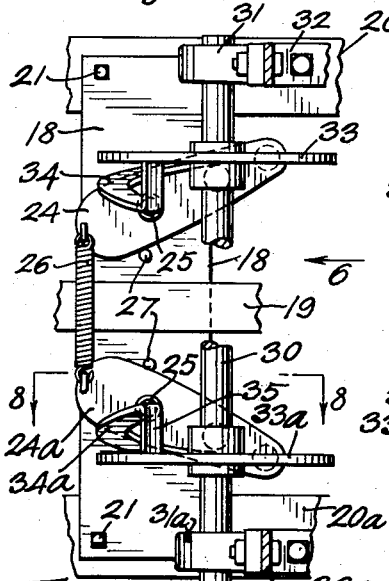
Figure 5 is an elevational view of the attachment that forms the subject of this invention.

Referring now to the drawing, reference numeral 10 represents the bale chamber; 11 the plunger; 12 the feeder auger; 13 the needles; 14 the bill-hook, assemblies, twine disks, twine holders and associated parts; and 15 the bill-hook drive mechanism. The devices just identified will not be described in detail because they represent old and well known assemblies and have been shown by "blocks" for the purpose of more easily defining applicant's invention which has been designated by reference 16 in Figure 1. In Figures 2, 3 and 4 the twines functioning to bind the bales have been designated by numeral 17.

Figures 6, 7:
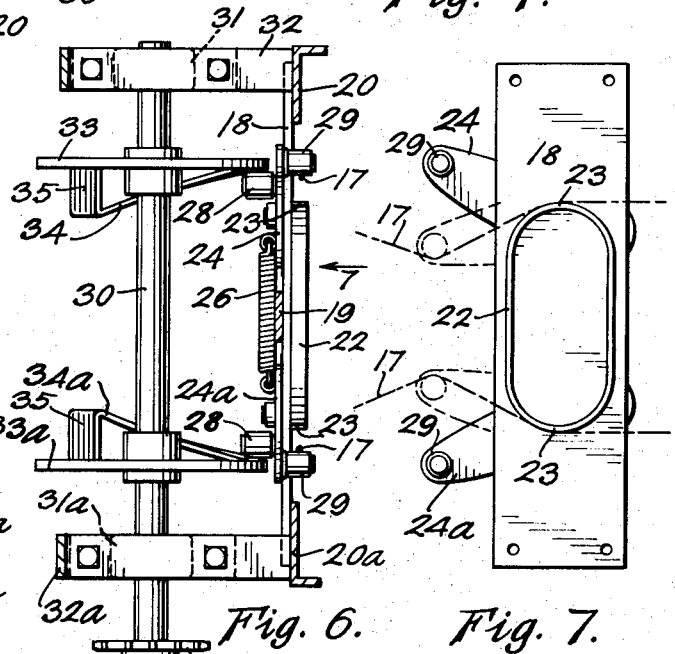
Figure 6 is a side elevational view looking towards the left in Figure 5.
Figure 7 is a rear elevational view looking in the direction of arrow 7 in Figure 6; and, Figure 8 is a view, partly in section, looking downwardly through plane 8—8 Figure 5.
Figure 8:
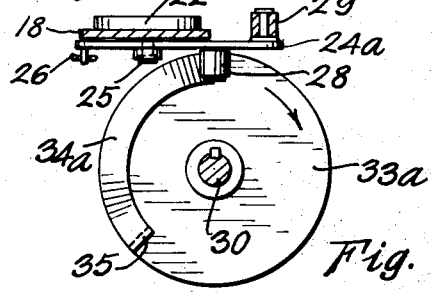

Applicant's attachment has been shown in Figures 5, 6, 7 and 8 and will now be described in detail. Reference numeral 18 designates a plate that will be referred to as a base and which is attached to the bale chamber in some suitable manner and which has been shown as positioned inside of the central bale chamber bar 19 and outside of the top and the bottom bale chamber bars 20 and 20a. Base 18 may be welded to bars 20 and 20a or attached to them by bolts 21. Attached to the rear of base 18 is an oblong flange 22 with arcuate ends 23. Pivotally attached to base 18 are two levers 24 and 24a which move about pivots 25. The left hand ends of levers 24, 24a are joined by a tension spring 26 that normally holds the levers against the stops 27. Attached to and projecting outwardly from levers 24 are rollers 28 that serve as cam followers as will presently be described. Attached to and projecting inwardly from levers 24 are twine engaging rollers 29. A cam shaft 30 is mounted for rotation in bearings 31 and 31a mounted on brackets 32 and 32a bolted or otherwise attached to bars 20 and 20a and are steadied by inclined braces 32. Shaft 30 carries two spaced cam disks 33 and 33a on the surfaces of which rollers 28 normally rest, as shown in Figure 6. Attached to the opposing surfaces of disks 33 and 33a are arcuate cams 34 and 34a that terminate at their highest ends in vertical walls 35. The lower end of shaft 30 carries a sprocket wheel 36 and this is operatively connected with sprocket wheel 37 at the lower end of shaft 15 by a sprocket chain 38. Shaft 15 is rotated periodically by means of the power that drives the machine and has two gear wheels 39 and 39a that have short arcuate sections 40 of gear teeth which serve to operate the bill-hook and other parts of the tying mechanism. When shaft 15 turns it will also turn shaft 30 in a clockwise direction, when viewed as in Figure 8. Cams 34 move rollers 29 inwardly from the full line position shown in Figure 7 to the dotted line position and this bends the twine about the curved ends of flange 22 as shown by dotted lines in Figures 4 and 7. The parts are so adjusted and synchronized that immediately before the bill-hook starts turning the rollers reach the high ends of cams 34 and drop suddenly onto the surfaces of plates 33 thereby permitting the twines to assume a straight position and thus releasing sufficient slack to prevent the formation of breaking strains.

In the above description and on the accompanying drawing a construction has been shown that has been designed for a certain make of baler and obviously the parts may have to be modified in some particulars to adapt them to other makes of balers. The idea of providing slack by putting bends in the twines and releasing the bends immediately before the bill-hook begins to turn is the broad idea underlying this invention. Even where the balers are provided with other slack forming means this attachment is frequently desirable to provide additional slack.

What is claimed as new is:

1. A slack producing device for use with hay balers having a bale forming mechanism including means for encircling the bale lengthwise with twine, a bill-hook and means for rotating the same for tying the ends of the twine, said slack producing device comprising, a base for attachment to the baler adjacent one side thereof, a lever pivoted to the base, one end having a projection on the side facing the bale, positioned to engage the twine, spring means operatively associated with the lever urging the projection away from the twine and a cam mounted for rotation adjacent the base and adapted to move said lever into contact with the twine in opposition to the spring means, the lever having a cam follower projecting outwardly therefrom positioned to engage the cam surface, and means comprising the bill-hook rotating means for turning the cam to effect a release of the twine slack immediately before the bill-hook turns.

2. A slack forming device adapted to be attached to the outer wall of a baler chamber, comprising an elongated base, two levers positioned on the base and mounted for pivotation thereon, a helical tension spring joining corresponding ends of the levers to urge the adjacent ends thereof towards each other, stop means limiting the movement of the levers in response to the action of the spring, the other ends of the levers projecting beyond the opposite edge of the base, twine engaging rollers attached to the last mentioned ends of the levers at a point beyond the opposite side of the base, the levers having each a cam follower roller positioned at a point between the pivot and the twine engaging rollers, and means comprising a cam shaft provided with two spaced cam disks each of which has a cam surface positioned for operative engagement with the cam follower rollers to effect simultaneous pivotation of the levers to move the twine engaging rollers into contact with twine carried by said baler, and means for turning the cam shaft to oscillate the levers about their pivots.

References Cited in the file of this patent

UNITED STATES PATENTS 2,649,043    Jones et al. _____ Aug. 18, 1953